US010162570B2

(12) United States Patent
Chen

(10) Patent No.: US 10,162,570 B2
(45) Date of Patent: Dec. 25, 2018

(54) METHODS AND APPARATUSES OF COMPENSATING FOR DELAYS CAUSED BY AN EXTENSION LINE OF A STORAGE DEVICE

(71) Applicant: AutoChips Inc., Hefei Anhui (CN)

(72) Inventor: Songlin Chen, Hefei Anhui (CN)

(73) Assignee: AUTOCHIPS INC., Hefei, Anhui Province (CN)

( * ) Notice: Subject to any disclaimer, the term of this patent is extended or adjusted under 35 U.S.C. 154(b) by 293 days.

(21) Appl. No.: 15/341,620

(22) Filed: Nov. 2, 2016

(65) Prior Publication Data

US 2017/0337012 A1 Nov. 23, 2017

(30) Foreign Application Priority Data

May 18, 2016 (CN) .......................... 2016 1 0339223

(51) Int. Cl.
*G11C 7/22* (2006.01)
*G06F 3/06* (2006.01)
*G06F 11/30* (2006.01)

(52) U.S. Cl.
CPC .......... *G06F 3/0659* (2013.01); *G06F 3/0611* (2013.01); *G06F 3/0613* (2013.01); *G06F 3/0653* (2013.01); *G06F 3/0679* (2013.01); *G06F 11/3034* (2013.01)

(58) Field of Classification Search
CPC ...................................................... G11C 7/22
USPC ....................................................... 711/100
See application file for complete search history.

(56) References Cited

U.S. PATENT DOCUMENTS

| 2008/0048747 | A1* | 2/2008 | Iizuka | G11C 7/1066 327/261 |
| 2009/0225787 | A1* | 9/2009 | Andre | H04J 3/0658 370/503 |
| 2010/0141312 | A1* | 6/2010 | Lee | G11C 7/22 327/158 |
| 2010/0220536 | A1* | 9/2010 | Coteus | G06F 13/1689 365/193 |
| 2012/0093258 | A1* | 4/2012 | Suh | H04B 7/0623 375/295 |
| 2013/0287082 | A1* | 10/2013 | Chen | H04L 7/0037 375/226 |
| 2014/0355359 | A1* | 12/2014 | Linam | G11C 7/222 365/189.02 |

(Continued)

*Primary Examiner* — Min Huang
(74) *Attorney, Agent, or Firm* — Cheng-Ju Chiang

(57) ABSTRACT

Methods and apparatuses of compensating for delays of a storage device are disclosed. The method includes: performing a communication operation a preset number of times with the storage device through the extension line, each time if a correct response is received from the storage device, recording a status value of the current communication operation as a first value, otherwise recording as a second value, to obtain a resultant data string; searching, in the resultant data string, for a longest data segment comprised of the continuous first values; taking a delay value of the communication operation corresponding to the status value at the middle position of the longest data segment as an optimal delay value; and setting the optimal delay value as a phase difference between a source clock and a sampling clock of the storage device to compensate for the delays caused by the extension line of the storage device.

14 Claims, 5 Drawing Sheets

(56) References Cited

U.S. PATENT DOCUMENTS

2014/0368243 A1 12/2014 Kim
2015/0193316 A1* 7/2015 Dreps .................... G06F 11/24
                                                      714/4.5

* cited by examiner

METHODS AND APPARATUSES OF COMPENSATING FOR DELAYS CAUSED BY AN EXTENSION LINE OF A STORAGE DEVICE

CROSS-REFERENCE TO RELATED APPLICATIONS

This application claims priority to Chinese Patent Application No. 201610339223.X, filed May 18, 2016 in the China Intellectual Property Office, the contents of which are incorporated by reference herein.

FIELD OF ART

The present disclosure relates to the field of communications, and more particularly, to methods and apparatuses of compensating for delays caused by an extension line of a storage device.

BACKGROUND

In vehicle computer systems, the slot for a storage device, such as a memory card, memory stick, or Secure Digital ("SD") card, is not typically disposed on the main printed circuit board ("PCB"), but arranged on the operation panel and connected to the main PCB via an extension line.

Typically, the transmission speed of electric current in different conductors may vary, and may generally lie in a range from $2\times10^8$ m/s to $3\times10^8$ m/s. Consequently, a wire with a length of 1 m can incur a delay of 4-5 ns, which can be doubled over the signal round trip for a total delay of 8-10 ns. The increased time may then cause sampling deviations of the storage device. The presence of the extension line may increase the signal propagation delay and the signal interference probability, which can cause compatibility issues with some storage devices. Existing solutions include down conversion, in which the clock frequency of the storage device is lowered from 50 MHz to around 12 MHz, resulting in significant reduction in the transmission speed of the storage device and deterioration in storage and system performance.

SUMMARY

Methods and apparatuses of compensating for delays caused by an extension line of a storage device are disclosed, to ensure a desired transmission rate of the storage device, and thus improve the overall system performance.

A method of compensating for delays caused by an extension line of a storage device is provided. The method comprises: performing a communication operation a preset number of times with the storage device via the extension line; each time a correct response is received from the storage device, recording a status value of the current communication operation as a first value, otherwise recording the status value of the current communication operation as a second value; obtain a resultant data string of the recorded status values; searching the resultant data string for a longest data segment comprised of continuous first values; taking a delay value of the communication operation corresponding to the status value at a middle position of the longest data segment as an optimal delay value; and setting the optimal delay value as a phase difference between a source clock and a sampling clock of the storage device to compensate for the delays caused by the extension line of the storage device.

Each communication operation may comprise a command communication operation or a data communication operation, while the optimal delay value may comprise an optimal command delay value or an optimal data delay value. The block of performing the communication operation a preset number of times with the storage device via the extension line may comprise: performing the command communication operation the preset number of times with the storage device via a command bus of the extension line to obtain multiple corresponding status values of the command communication operations; or performing the data communication operation the preset number of times with the storage device via a data bus of the extension line to obtain multiple corresponding status values of the data communication operations.

The block of performing the command communication operation the preset number of times with the storage device via the command bus of the extension line to obtain the multiple corresponding status values of the command communication operations may comprise: setting an initial delay value for the command communication operation to 0; sending via the command bus of the extension line a pre-stored command to the storage device; if a response without a cyclic redundancy check ("CRC") error is received from the storage device through the command bus of the extension line, then recording the status value of the current command communication operation as the first value, otherwise recording the status value of the current command communication operation as the second value; increasing the delay value by 1 and determining whether the resultant delay value reaches a preset value, and if so, ending the process, but if not, returning to execute the block of sending a subsequent pre-stored command to the storage device.

The block of performing the data communication operation the preset number of times with the storage device via the data bus of the extension line to obtain the multiple corresponding status values of the data communication operations may comprise: setting an initial delay value for a data read communication operation to 0; sending via the command bus of the extension line a pre-stored data read command to the storage device; if data without a CRC error is correctly received from the storage device via the data bus of the extension line, then recording the status value of the current data read communication operation as the first value, otherwise recording the status value of the current data read communication operation as the second value; increasing the delay value by 1 and determining whether the resultant delay value reaches a preset value, and if so, ending the process, but if not, returning to the block of sending a subsequent pre-stored data read command to the storage device.

The block of performing the data communication operation the preset number of times with the storage device via the data bus of the extension line to obtain the multiple corresponding status values of the data communication operations may comprise: setting an initial delay value for a data write communication operation to be 0; sending via the command bus of the extension line a pre-stored data write command to the storage device, and sending via a data bus of the extension line the data to be written to the storage device; if a response indicative of a data write success is correctly received from the storage device, then recording the status value of the current data write communication operation as the first value, otherwise recording the status value of the current data write communication operation as the second value; increasing the delay value by 1 and determining whether the resultant delay value reaches a preset value, and if so, ending the process, but if not, returning to execute the block of sending a subsequent pre-stored data write command to the storage device.

Each data communication operation may comprise a data read communication operation or a data write communication operation. The block of searching for the longest data segment comprised of the continuous first values may comprise: searching for a first longest data segment corresponding to the data read communication operation and a second longest data segment corresponding to the data write communication operation. The block of taking the delay value of the communication operation corresponding to the status value at the middle position of the longest data segment as the optimal delay value may then comprise: taking the delay value corresponding to status value at the middle position of the overlapped portion of the first and second longest data segments as the optimal data delay value.

An apparatus of compensating for delays caused by an extension line of a storage device is also provided. The apparatus comprises: an communication operating module configured to perform a communication operation a preset number of times with the storage device via the extension line, each time if a correct response is received from the storage device, then record a status value of the current communication operation as a first value, otherwise record the status value of the communication operation as a second value, to obtain a resultant data string; a lookup module coupled to the communication operating module and configured to search, in the resultant data string, for a longest data segment comprised of the continuous first values; a processing module coupled to the lookup module and configured to take a delay value of the communication operation corresponding to the status value at the middle position of the longest data segment as an optimal delay value; and a configuration module coupled to the processing module and configured to set the optimal delay value as a phase difference between a source clock and a sampling clock of the storage device to compensate for the delays caused by the extension line of the storage device.

Each communication operation may comprise a command communication operation or a data communication operation, while the optimal delay value may comprise an optimal command delay value or an optimal data delay value. The communication operating module may comprises: a command communication module configured to perform the command communication operation the preset number of times with the storage device via a command bus of the extension line, to obtain multiple corresponding status values of the command communication operations; and a data communication module configured to perform the data communication operation the preset number of times with the storage device via a data bus of the extension line, to obtain multiple corresponding status values of the data communication operations.

Specifically, the command communication module may: set an initial delay value for the command communication operation to 0; send via the command bus of the extension line a pre-stored command to the storage device; if a response without a CRC error is received from the storage device, then record the status value of the current command communication operation as the first value, otherwise record the status value of the current command communication operation as the second value; increase the delay value by 1 and determine whether the resultant delay value reaches a preset value, and if so, ending the process, but if not, return to execute the operation of sending a subsequent pre-stored command to the storage device.

The data communication module may alternatively: set an initial delay value for a data read communication operation to 0; send via the command bus of the extension line a pre-stored data read command to the storage device; if data without a CRC error is correctly received from the storage device via a data bus of the extension line, then record the status value of the current data read communication operation as the first value, otherwise record the status value of the current data read communication operation as the second value; increase the delay value by 1 and determine whether the resultant delay value reaches a preset value, and if so, ending the process, but if not, return to execute the operation of sending a subsequent pre-stored data read command to the storage device.

The data communication module may alternatively: set an initial delay value for a data write communication operation to 0; send via the command bus of the extension line a pre-stored data write command to the storage device, and send the data to be written to the storage device via the data bus of the extension line; if a response indicative of a data write success is correctly received from the storage device, record the status value of the current data write communication operation as the first value, otherwise record the status value of the current data write communication operation as the second value; increase the delay value by 1 and determine whether the resultant delay value reaches a preset value, and if so, ending the process, but if not, return to execute the operation of sending a subsequent pre-stored data write command to the storage device.

Each data communication operation may comprise a data read communication operation or a data write communication operation. The lookup module may be configured to: search for a first longest data segment corresponding to the data read communication operation and a second longest data segment corresponding to the data write communication operation. The processing module may take the delay value corresponding to the status value at the middle position of the overlapped portion of the first and second longest data segments as the optimal data delay value.

According to the above method and apparatus of compensating for delays of a storage device, a communication operation is performed a preset number of times with the storage device through the extension line, each time if a correct response is received from the storage device, then a status value of the current communication operation would be recorded as a first value, otherwise it will be recorded as a second value, to obtain a resultant data string; a longest data segment comprised of the continuous first values then could be searched from the resultant data string, and finally the delay value of the communication operation corresponding to the status value at the middle position of the longest data segment can be taken as the optimal delay value, which can be set as the phase difference between the source clock and the sampling clock of the storage device to compensate for the delays caused by the extension line of the storage device, thus the transmission speed of the storage device can be ensured and the overall system performance can be improved.

BRIEF DESCRIPTION OF THE DRAWINGS

These and other features and advantages of the present device, system, and method will become appreciated as the same becomes better understood with reference to the specification, claims and appended drawings wherein:

DETAILED DESCRIPTION

Hereinafter, technical implementations of the disclosure will be described in definite and comprehensive details with reference to the accompanying drawings. Obviously, the embodiments as described are only some but not all the embodiments of the disclosure. All other embodiments obtained by those of skill in the art based on the embodiments of the disclosure without making inventive efforts shall all fall in the protection of the disclosure.

Figure 1:
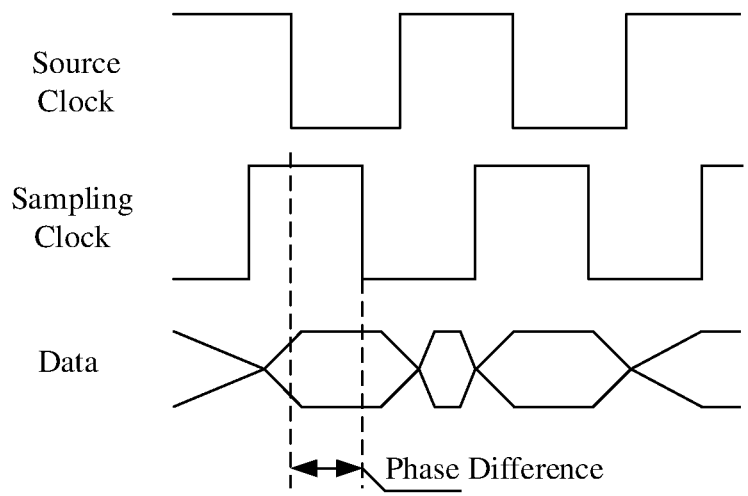
FIG. 1 is a schematic diagram illustrating the phase difference between a source clock and a sampling clock of a storage device according to an embodiment of the disclosure.

In a computer device or system, a storage device, such as an SD card, may be coupled to a printed circuit board (PCB) of the computer device or system via an extension line. The extension line may introduce time delays when a processor executes program instructions providing for performing communication operations with the storage device via the extension line. FIG. 1 shows a schematic diagram illustrating an example of a phase difference between a source clock and a sampling clock of a storage device according to an embodiment of the present disclosure. The phase difference between the source clock and the sampling clock can be defined as the phase difference between a falling edge of the source clock and a falling edge of the sampling clock that is adjacent to the falling edge of the source clock. It can also be defined as that between a rising edge of the source clock and a rising edge of the sampling clock that is adjacent to the rising edge of the source clock.

When performing communication operations with the storage device via the extension line, the source clock can be used as a reference clock to send communication operations such as commands or data to the storage device. The commands or data may be transferred to the storage device through the chip pins, printed circuit board (PCB) traces, and the extension line. The storage device may then reply with a corresponding response or data. The storage device may use the sampling clock as the reference clock to sample and so receive a response or data. The phase difference between the source clock and the sampling clock can be adjusted to compensate for the timing delays caused by the extension line.

Figure 2:
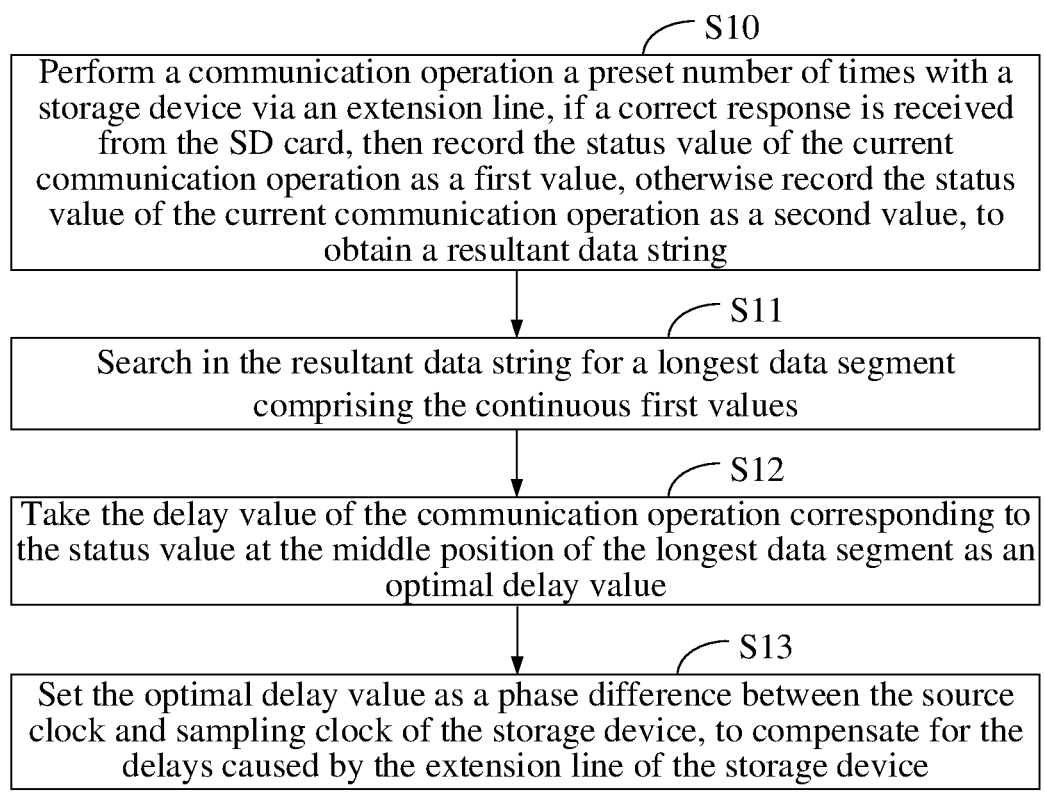
FIG. 2 is a flowchart illustrating a method of compensating for delays caused by an extension line of the storage device according to an embodiment of the disclosure.

FIG. 2 is a flowchart illustrating a process of compensating for delays caused by an extension line of a storage device according to an embodiment. In some embodiments the process is performed by a computing device with a processor and an associated memory card reader. Referring now to FIG. 2, the process may comprise the following blocks.

In block S10, a communication operation can be conducted a preset number of times with the storage device via the extension line. Each time a communication operation is carried out, if a correct response from the storage device is received, a status value of the current communication operation maybe recorded as a first value. If a correct response is not received from the storage device, the status value of the current communication operation may be recorded as a second value.

To compensate for the delays caused by the extension line of the storage device, an external test tool can be configured first to test the delays caused by the extension line of the storage device. Specifically, the external test tool may perform the communication operation the preset number of times with the storage device through the extension line. Each communication operation may be a command communication operation or a data communication operation. The external test tool can control a driver for the storage device to implement a test program to scan the pre-stored command communication operations or data communication operations one by one, in order to transfer them to the storage device through the extension line. Hence, typically the driver for the storage device is set to a scan mode prior to block S10. If, then, a correct response from the storage device is received, a status value of the current communication operation would be recorded as the first value; otherwise if a correct response from the storage device is not received, the status value of the current communication operation would be recorded as the second value. The first and second values can be, for example, 0 or 1. As a result, after performing the communication operations the preset number of times and recording the corresponding status values, a continuous data string comprised of 0s and 1s can be obtained. The method can then proceed to block S11.

In block S11, the longest data segment comprised of continuous first values in the resultant data string is determined. The longest data segment can be stored in a memory. The process can continue to block S12.

In block S12, the delay value of the communication operation corresponding to the status value at a middle position of the longest data segment can be taken as an optimal delay value. The process can proceed to block S13.

In block S13, the optimal delay value can be set as the phase difference between the source clock and the sampling clock of the storage device to compensate for the delays caused by the extension line of the storage device.

In one example, if the test gives a set of status values after scan is as follows: [1,0,0,1,1,1,1,1,1,1,0,0,0,0,1,1,1,0,0,0,1, 0,0,1,1,0,0,1,0,0,0], then the desired longest data segment can be the data segment comprised of continuous 7 status values from the 4th to the 10th position, each being 1, which is indicative of a longest data segment of status values corresponding to a correct "transmitting-receiving-responding" process of the command or data communication operation.

Among the data segment consisting of all the status values, the delay value of the communication operation corresponding to the middle value of the longest data segment can be taken as the optimal delay value, which can then be configured as the phase difference between the source clock and sampling clock of the storage device, to compensate for the delays caused by the extension line. In the given example regarding the longest data segment, the middle value would be the 4th status value therein while the 7th in the whole set of status values. Therefore, the delay value corresponding to this middle status value can be taken as the optimal delay value.

According to the current embodiment, the selected optimal delay value can be allowed to have a relatively greater error fluctuation range due to selecting the delay value corresponding to the middle value in the longest continuous data segment comprised of continuous first value as the optimal value. In other words, even if there exists a certain deviation in the selected delay value, the communication operation corresponding to the delay value selected from a certain tolerance range can be guaranteed to have a correct "transmitting-receiving-responding" status. Thus, during the practical communication process, incorrect communication operations due to external environmental changes can be avoided, even if the environmental changes lead to timing variations.

The communication operation conducted with the storage device through the extension line in the block S10 can be a command communication operation or a data communication operation, while the optimal delay value can comprise an optimal command delay value or an optimal data delay value.

Figure 3:
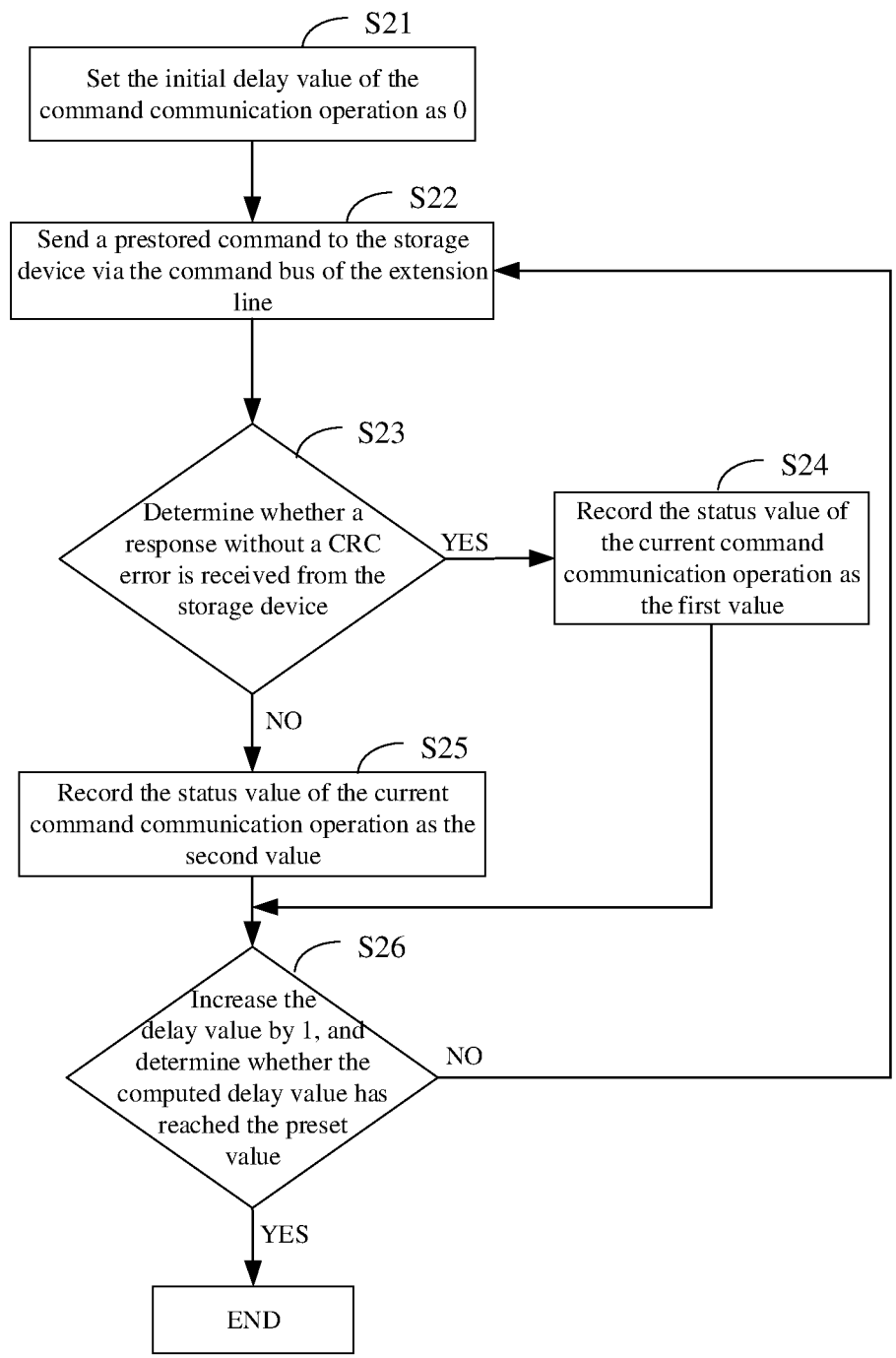
FIG. 3 is a flowchart illustrating the performance of command communication operations with the storage device via the extension line according to an embodiment of the disclosure.

FIG. 3 is a flowchart illustrating the performance of command communication operations with a storage device via the extension line according to an embodiment of the present disclosure. The process of performing the command communication operations with the storage device via the extension line can comprise the following blocks.

In block S21, an initial delay value of the command communication operation can beset to 0. The process can continue to block S22.

In block S22, a preset command can be transmitted to the storage device via a command bus of the extension line. The driver for the storage device can be preset to a scan mode in this embodiment, so that in block S22, the driver can sequentially scan a plurality of pre-stored command communication operations in advance. Each of the command communication operations can enable (or expect) a response, meaning if a recipient successfully receives the command communication operation, a response informing the successful receipt would be returned. The process can then continue to block S23.

In block S23, the process determines whether a response without a cyclic redundancy check (CRC) error is received from the storage device. If a response without the CRC error is received from the storage device, the process can continue to block S24. If a response without the CRC error is not received from the storage device, the process continues to block S25.

In block S24, the status value of the current command communication operation can be recorded as a first value, and the process continues to block S26.

In block S25, the status value of the current command communication operation can be recorded as a second value, and the process continues to block S26.

To further elaborate, after the command communication operation has been transmitted to the storage device, the process determines whether a response without a CRC error is received from the storage device. That is, the process determines whether the storage device can successfully receive the command via the extension line. If a correct received response is returned from the storage device, then the status value of the current command communication operation would be recorded as the first value. Otherwise the corresponding status value of the current command communication operation will be recorded as the second value. The first and second values can be, for example, 0 or 1.

In block S26, after the corresponding status value of the current command communication operation has been recorded, the delay value can be added by 1. The resultant delay value indicates the number of command communication operations conducted with the storage device. If the delay value has reached the preset value, then the process can end. If the delay value has not reached the preset value, the process can return back to block S22 to transmit a subsequent pre-stored command to the storage device via the command bus of the extension line and to record a corresponding status value of the subsequent command, until the command communication operations have been performed the preset number of times and the status values of all the command communication operations have been recorded to obtain a complete data string comprised of all status values.

Note that the corresponding delay value of each command communication operation may be equal to the sequence number of the command communication operation reduced by 1. Assume, for example, the first value is 1 while the second value is 0. In the above data string: [1,0,0,1,1,1,1,1, 1,1,0,0,0,0,1,1,1,0,0,0,1,0,0,1,1,0,0,1,0,0,0], the longest data segment comprised of the continuous first values would be the data segment comprised of 4th-10th status values. Because the sequence number of the delay value corresponding to the status value at the middle position of this longest data segment is 7, the corresponding delay value would then be 6. Thus, the optimal delay value is 6 in this embodiment. It also should be noted that in actual operations, the clock frequency can be configured as 50 MHz when transmitting the pre-stored commands, which can be the highest clock frequency of the storage device. In addition, the preset value for the delay value can typically be determined empirically and can be around 0.5 clock cycles.

Alternatively, in block S10, commands not enabling or not expecting responses can also be transmitted to the storage device instead of sending commands enabling responses. In particular, when sending the commands not enabling responses to the storage device, the operating clock frequency can be controlled within the range of 6-15 MHz, and the specific value can be determined empirically, while the default delay value can be configured to ensure a correct transmission of the command.

Figure 4:
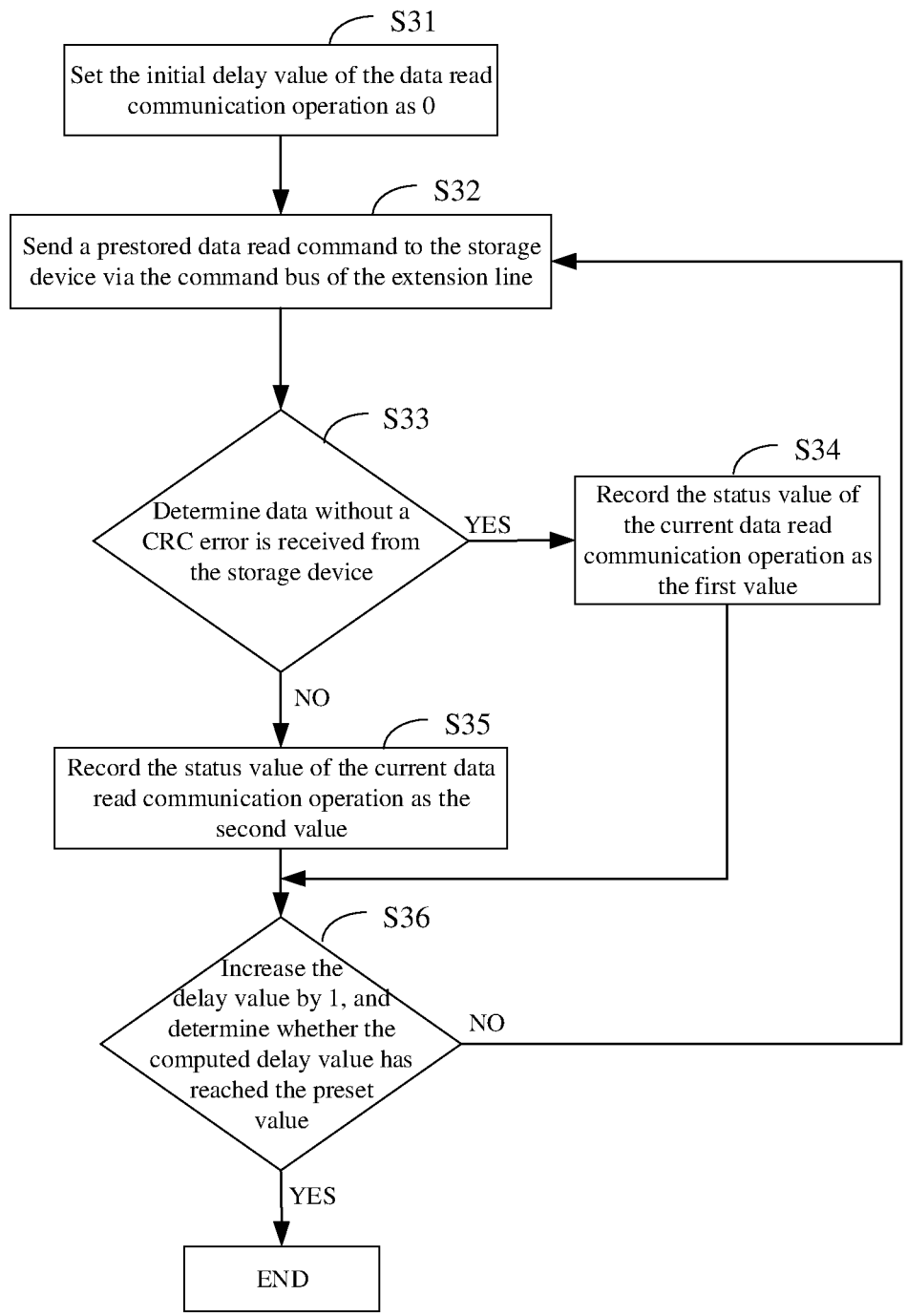
FIG. 4 is a flowchart illustrating the performance of data read communication operations with the storage device via the extension line according to an embodiment of the disclosure.

Data communication operations may comprise a data read communication operation or a data write communication operation. Since the data read communication operation and data write communication operation may be processed differently according to the disclosure, the two will be separately described hereinafter. FIG. 4 is a flowchart illustrating the performance of data read communication operations with a storage device via the extension line according to an embodiment. Referring now to FIG. 4, the process of performing the data read communication operations with the storage device through the extension line can comprise the following blocks.

In a first block S31, an initial delay value of a data read communication operation can be set to 0. The initial delay value may also be set to any value other than 0. The process can continue to block S32.

In the following block S32, a preset data read command can be transmitted to the storage device via a command bus of the extension line.

Similar to the above embodiment carrying out the command communication operations, the driver of the storage device can also be configured beforehand to the scan mode prior to the implementation of the current embodiment, so that in block S32 the driver can sequentially scan the multiple pre-stored data read command communication operations. The method can then proceed to block S33.

In the following block S33, it is determined whether data without a CRC error is received from the storage device. If data without a CRC error is received from the storage device, the process continues to block S34; otherwise, the process continues to block S35.

In block S34, the status value of the current data read communication operation is recorded as the first value, and the process continues to block S36.

In block S35, the status value of the current data read communication operation is recorded as the second value, and the process continues to block S36.

After the data read communication operation is transmitted to the storage device, it may be determined whether data without a CRC error is received from the storage device via the data bus of the extension line to determine whether the storage device can correctly respond to the data read command. If the correct data is received from the storage device via the data bus of the extension line, then the corresponding status value of the current data read communication operation would be recorded as the first value; otherwise, the status value of the current data read communication operation would be recorded as the second value.

In block S36, the delay value is increased by 1, and it is determined whether the computed delay value has reached the preset value, and if so, the process ends, but if not, the process returns to block S32.

Figure 5:
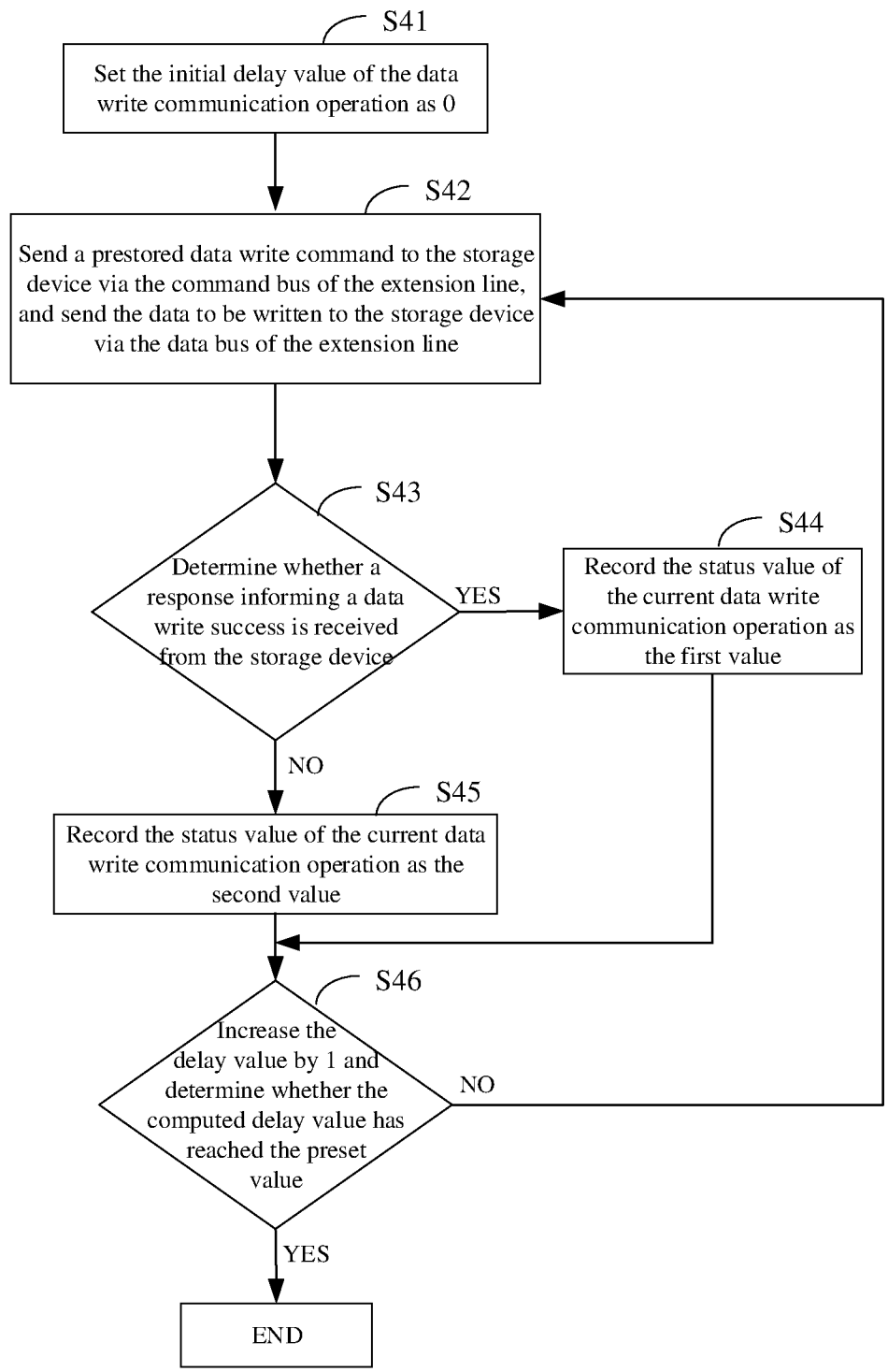
FIG. 5 is a flowchart illustrating the performance of data write communication operations with the storage device via the extension line according to an embodiment of the disclosure.

FIG. 5 is a flowchart illustrating the performance of data write communication operations with a storage device via the extension line according to an embodiment. Referring now to FIG. 5, the method of performing the data write communication operations with the storage device via the extension line can comprise the following blocks.

In a first block S41, an initial delay value of the data write communication operation is set to 0. The method can continue to block S42.

In the following block S42, a pre-stored data write command is transmitted to the storage device via the command bus of the extension line, and the data to be written is transmitted to the storage device via the data bus of the extension line.

Differing from the aforementioned data read communication operations, in the current embodiment, apart from sending the data write command to the storage device, the data to be written may be transmitted right after to the storage device via the data bus of the extension line. The method may then continue to block S43.

In the following block S43, it is determined whether a response indicative of a data write success is received from the storage device, and if so, the process continues to block S44, but if not, the process continues to block S45.

In block S44, the status value of the current data write communication operation is recorded as the first value, the process continues to block S46

In block S45, the status value of the current data write communication operation is recorded as the second value, the process continues to block S46.

If the storage device can correctly receive the data to be written, then it may return a response informing the data write success. Hence, if a correct response is returned from the storage device, the status value of the current data write communication operation can be recorded as the first value; otherwise, the status value of the current data write communication operation would be recorded as the second value.

In block S46, the delay value is increased by 1, and it is determined whether the computed delay value has reached the preset value, and if so, the process ends, but if not, the process continues to block S42.

In the testing process with the above data read or write communication operations, the associated operating clock frequency of sending data read or write commands can also be configured to 50 MHz, i.e., the highest clock frequency of the storage device under the SDR25 mode.

Because there are two types of data communication operations, i.e., the data read communication operation and the data write communication operation, two data strings comprised of multiple status values can be obtained after the completion of the preset times of data read and write communication operations, respectively. Therefore, in block S11, two longest data segments may be respectively searched from the two data strings, i.e., a first longest data segment corresponding to the data read communication operations and a second longest data segment corresponding to the data write communication operations. Although, in practice, the two data strings may not be necessarily identical or may be slightly different, the longest data segments contained respectively in the two data strings may substantially overlap due to the consistency of the operating environment. Thus, the optimal data delay value can be selected from the overlapped portion. Specifically, in block S12 the delay value corresponding to the status value at the middle position of the overlapped portion of the first and second longest data segments can be taken as the optimal data delay value.

If, for example, the status values derived as the result of sending data read commands to the storage device are recorded as follows:

[0,0,1,1,0,0,0,1,1,1,1,1,1,1,0,0,0,0,0,1,1,1,1,0,0,0,0, 1], then the desired first longest data segment would be the data segment comprised of continuous 8 status values from the 8th-15$^{th}$ position, each being 1.

Likewise, if the status values derived as the result of sending data write commands to the storage device are recorded as follows:

[0,1,1,0,0,0,0,0,1,1,1,1,1,1,1,0,0,1,0,0,1,1,1,1,1,0,0, 1], then the desired second longest data segment would be the data segment comprised of continuous 8 status values from the 9th-16$^{th}$ position, each being 1.

The overlapped portion of the above searched first and second longest data segments would then be the data segment comprised of the 7 status values ranging from the 9th-15$^{th}$ position, hence the corresponding middle value would be the status value with the sequence number 12, i.e., the 12th status value. Because the delay value of the corresponding communication operation is 11, the optimal data delay value would be 11.

The optimal delay value as selected according to the methods above can have a relatively greater error fluctuation range. In other words, even if there exists a certain deviation of the selected delay value, the communication operation corresponding to the delay value selected from a certain tolerance range can be guaranteed to have a correct "transferring-receiving-responding" status. Thus, during the practical communication process, the communication operations can be avoided from going abnormal due to external environmental changes, even if when the environmental changes lead to timing variations.

Typically, in practice the storage device configured with the above parameter can satisfy the normal transmission process. However, it would still be difficult to avoid burst interference to the communication operations with the storage device. So the robustness of the communication operating software needs to be enhanced so that specific solutions can be established aiming at different errors which may occur during the communication process in order to allow the system to conduct communication operations with the storage device properly. Specifically, the errors that may mainly happen during the communication process with the storage device may include the response indicative of the CRC error returned from the storage device, and the communication operation timeout.

When the response labeled with a CRC error is received from the storage device, the corresponding optimal delay value of the command communication operation or data communication operation can be adjusted dynamically, the current command/data can be retransmitted, to allow the system to return back to normal. Alternatively, the current command/data can be re-transmitted after the clock frequency is decreased, so that the system can be recovered. For the former, a certain adjustment range can be preset for the optimal delay value, thus the optimal delay value can be adjusted within the preset range.

When it comes to the communication operation timeout of the storage device, the disclosure can re-transmit the current command/data, cut off the storage device's hardware power and reboot the storage device before re-transmission, or reduce the clock frequency before re-transmitting the current command/data, to enable the system back to normal.

Figure 6:
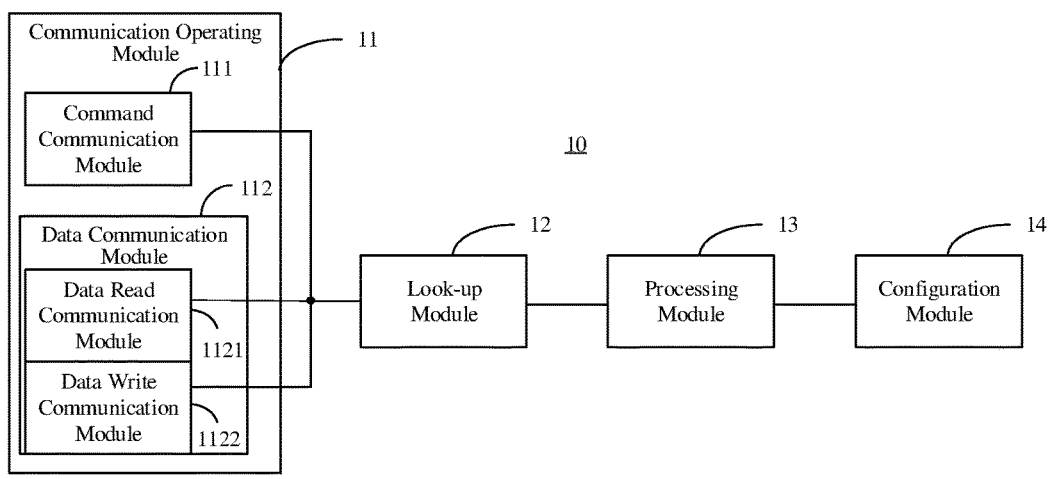
FIG. 6 is a block diagram illustrating an apparatus of compensating for delays caused by an extension line of the storage device according to an embodiment of the disclosure.

FIG. 6 is a block diagram illustrating an apparatus of compensating for delays caused by an extension line of a storage device according to an embodiment. One or more aspects described herein may be implemented using programmatic modules or components. A programmatic module or component may include a program, a subroutine, a portion of a program, a software component, or a hardware component capable of performing one or more stated tasks or functions. In addition, a module or component can exist on a hardware component independently of other modules or components. Alternatively, a module or component can be a shared element or process of other modules, programs or machines.

Referring to FIG. 6, the apparatus 10 of compensating delays caused by the extension line of the storage device may comprise a communication module 11, a lookup module 12, a processing module 13, and a configuration module 14.

The communication module 11 may be configured to conduct a communication operation a preset number of times with the storage device via the extension line, if a correct response is received from the storage device, record a status value of the current communication operation as a first value, otherwise record the status value of the current communication operation as a second value.

To compensate for the delays caused by the extension line of the storage device, an external test tool can first be configured to test the delays caused by the extension line of the storage device. Specifically, the external test tool may perform the communication operation the preset number of times with the storage device through the extension line. Each communication operation may be a command communication operation or a data communication operation. The external test tool can control a driver for the storage device to implement a test program to scan one by one the pre-stored command communication operations or data communication operations, so as to transfer them to the storage device through the extension line. Thus, typically the driver for the storage device is set to a scan mode prior to the operations performed by the communication module 11. If a correct response is received from the storage device, a status value of the current communication operation would be recorded as the first value. If a correct response from the storage device is not received, the status value of the current communication operation will be recorded as the second value. The first and second values can be, for example, 0 or 1. As a result, after performing the communication operations the preset number of times and recording the corresponding status values, a data string comprised of continuous 0s and 1s can be obtained.

The lookup module 12 may be coupled to the communication module 11 and configured to search in the obtained data string for a longest data segment comprised of the continuous first values. The processing module 13 may be coupled to the lookup module 12 and configured to select the delay value of the communication operation corresponding to the status value at the middle position of the longest data segment as the optimal delay value. The configuration module 14 may be coupled to the processing module 13 and configured to set the optimal delay value as the phase difference between a source clock and a sampling clock of the storage device, to compensate for the delays caused by the extension line of the storage device.

Having obtained the resultant continuous data string, the lookup module 12 can search in the data string for the longest data segment comprised of the continuous first values, that is, the lookup module 12 can search for a longest data segment comprised of continuous status values each indicative of a correct "transmitting-receiving-responding" process of the corresponding command or data communication operation. If, for example, the test gives a set of status values as follows:

[1,0,0,1,1,1,1,1,1,1,0,0,0,0,1,1,1,0,0,0,1,0,0,1,1,0,0,1,0,0, 0], then the desired longest data segment would be the data segment comprised of continuous 7 status values ranging from the 4th to $10^{th}$ position, each being 1.

After the lookup module 12 has searched the longest data segment, the processing module 13 may directly take the delay value of the communication operation corresponding to the middle value in the longest data segment searched by the lookup module 12 as an optimal delay value, which can then be set as the phase difference between the source clock and sampling clock of the storage device, to compensate for the delays caused by the extension line of the storage device. For example, regarding the longest data segment as searched above, its middle value would be the 4th status value therein, which is also the 7th in the whole set of status values. Therefore, the delay value corresponding to this middle status value can be taken as the optimal delay value.

The processing module 13 selecting the middle value in the longest data segment comprised of the continuous first values as the optimal value can allow the selected optimal delay value to have a relatively greater error fluctuation range. In other words, even if there exists a certain deviation of the delay value selected by the processing module 13, the communication operation corresponding to the delay value selected from a certain tolerance range can be guaranteed to have a correct "transmitting-receiving-responding" status. Thus, during the practical communication process, abnormal communication operations can be avoided due to external environmental changes, even if the environmental changes lead to timing variations.

In some embodiments, the communication operation may comprise a command communication operation or a data communication operation, while the optimal delay value may comprise an optimal command delay value and an optimal data delay value. The communication module 11 may comprise a command communication module 111 and a data communication module 112. The command communication module 111 may be configured to set the driver of the storage device to the scan mode, and then perform a command communication operation with the storage device. It should be noted that each of these command communication operations enables or expects a response. If the recipient successfully receives the command communication operation, it would return a response informing the successful receipt. Specifically, the command communication module 111 may be configured to: perform a command communication operation the preset number of times with the storage device via a command bus of the extension line, and obtain a plurality of corresponding status values of the multiple command communication operations respectively; or perform a data communication operation the preset number of times with the storage device through a data bus of the extension line, and obtain a plurality of corresponding status values of the multiple data communication operations respectively.

In terms of the command communication operations, the command communication module 111 may be further configured to: set an initial delay value for the command communication operation to be 0; send via the command bus of the extension line a pre-stored command to the storage device; if a response without a CRC error is received from the storage device, then record the status value of the current command communication operation as the first value, otherwise record the corresponding status value of the current command communication operation as the second value; increase the delay value by 1 and determine whether the computed delay value reaches a preset value, and if so, end the process, but if not, return to execute the operation of sending a subsequent pre-stored command to the storage device. If the process returns to the operation of transmitting a subsequent pre-stored command to the storage device, then the status value of the subsequent command operation will be further recorded. Only until the command communication operation has been conducted the preset number of times and the corresponding status values of all the command communication operations have been recorded to obtain a data string comprised of multiple status values, will the process be terminated.

Note the corresponding delay value of each command communication operation may equal to the sequence number of the command communication operation reduced by 1. Assume, for example, the first value is 1 while the second value is 0, then in the above data string [1,0,0,1,1,1,1,1,1, 1,0,0,0,0,1,1,1,0,0,0,1,0,0,1,1,0,0,1,0,0,0], the longest data segment comprised of the continuous first values would be the data segment comprised of the 4th-10th status values, because the status value at the middle position of this longest data segment has the sequence number 7, so the corresponding delay value would be 6. Thus the optimal delay value is 6 in this embodiment. It also should be noted that in actual operations, the clock frequency at which the command communication module 111 transmits the pre-stored commands may be 50 MHz, which is the highest clock frequency of the storage device. In addition, the preset value for the delay value is typically determined empirically and is generally around 0.5 clock cycles.

Alternatively, the command communication module 111 can, other than transmitting to the storage device via the command bus of the extension line the commands enabling responses, send commands not enabling or expecting responses to the storage device via the command bus of the extension line. In particular, when sending to the storage device the commands not enabling or expecting responses, the associated operating clock frequency can be controlled within the range of 6-15 MHz, and the specific value can be determined empirically, meanwhile the default delay value can be configured to ensure a correct transmission of the command.

Each data communication operation may comprise a data read communication operation or a data write communication operation, while the data communication module 112 may comprise a data read communication module 1121 and a data write communication module 1122. Since the data read communication operation and the data write communication operation may be processed differently in the disclosure, the two will be separately described hereinafter. Similar to the above embodiment in which the command communication operations are carried out, the driver of the storage device can also be set beforehand to the scan mode regarding the data read communication operation, so that the driver can sequentially scan the multiple pre-stored data read command communication operations. The data read communication module 1121 may be configured to: set an initial delay value of the data read communication operation to 0; send via the command bus of the extension line a pre-stored data read command to the storage device; if data without a CRC error is correctly received from the storage device via the data bus of the extension line, then record the status value of the current data read communication operation as the first value, otherwise record the status value of the current data read communication operation as the second value; increase the delay value by 1 and determine whether the computed delay value reaches a preset value, and if so, the process ends, but if not, return to execute the operation of sending a subsequent pre-stored data read command to the storage device.

Regarding the data write communication operation, the data write communication module 1122 may be further configured to: set an initial delay value of the data write communication operation to 0; send via the command bus of the extension line a pre-stored data write command to the storage device, and send via the data bus of the extension line the data to be written to the storage device; if a response indicative of a data write success is correctly received from the storage device, then record the status value of the current data write communication operation as the first value, otherwise record the status value of the current data write communication operation as the second value; increase the delay value by 1 and determine whether the computed delay value reaches a preset value, and if so, the process ends, but if not, return to perform the operation of sending a subsequent pre-stored data write command to the storage device.

Typically, the first value can be selected as 1 while the second value as 0. In other embodiments, the first value can be 0 while the second value can be 1. This is not a restriction to the present invention. In the testing process with the above data read or write communication operations, the communication module 11 can also configure the associated operating clock frequency to 50 MHz, i.e., the highest clock frequency of the storage device under the SDR25 mode.

The lookup module 12 may search for a longest data segment comprised of the continuous first values. In terms of the command communication operations, the lookup module 12 can scan the status values recorded after sending to the storage device the commands enabling or expecting responses and directly search for the longest data segment comprised of the continuous first values. Accordingly, the processing module 13 may take the delay value of the communication operation corresponding to the status value at the middle position of the searched longest data segment as the optimal command delay value.

Regarding the data communication operations, because the data communication operation may comprise a data read communication operation or a data write communication operation, the performing of the above data read communication operations and data write communication operations for the preset number of times may render two sets of data strings comprised of multiple status values, respectively, while the lookup module 12 may be configured to: search respectively for two longest data segments, i.e., a first longest data segment corresponding to the data read communication operations and a second longest data segment corresponding to the data write communication operations. Although, in practice, the two sets of data strings may not be necessarily identical or may be slightly different), the longest data segments respectively contained in the two sets of data strings necessarily will substantially overlap due to the consistency of the operating environment. Thus, the optimal data delay value can be selected from the overlapped portion. Accordingly, the processing module 13 may take the delay value corresponding to the status value at the middle position of the overlapped portion of the first and second longest data segments as the optimal data delay value.

The above description elaborates the method and process of performing communication operations with the storage device via the extension line, of recording the corresponding status value of each communication operation, and of searching for the optimal delay value. It can allow the selected optimal delay value to have a relatively greater fluctuation range through searching for the longest data segment comprised of the continuous first values by the lookup module 12. In other words, even if there exists a certain deviation of the selected delay value, the communication operation corresponding to the delay value selected from a certain tolerance range can be guaranteed to have a correct "transmitting-receiving-responding" status. Thus, during the practical communication process, the communication operations can be avoided from going abnormal due to external environmental changes, even if when the environmental changes lead to timing variations.

According to the apparatus embodiment, after the apparatus 10 set the optimal delay value as the phase difference between the source clock and sampling clock of the storage device, the storage device can satisfy the common communication operations, however, it would be difficult to avoid burst interferences. So the robustness of the communication operating software needs to be enhanced that specific solutions need be established aiming at different errors that may occur during the communication process, in order to allow the system to conduct communication operations with the storage device properly. The errors that may mainly happen during the communication process with the storage device may comprise the response indicative of the CRC error returned from the storage device, and the communication operation timeout.

When the response labeled with a CRC error is received from the storage device, the corresponding optimal delay value of the command communication operation or data communication operation can be adjusted dynamically, and the current command/data can be retransmitted, to allow the system back to normal. Alternatively, the current command/data may be re-transmitted after the clock frequency is decreased, so that the system can be recovered. For the former, a certain adjustment range can be preset for the optimal delay value, thus the optimal delay value can be adjusted within the preset range.

While when it comes to the communication operation timeout of the storage device, the disclosure can re-transmit the current command/data, cut off the storage device's hardware power and reboot the storage device before retransmission, or reduce the clock frequency before retransmitting the current command/data, to enable the system back to normal.

In conclusion, according to the disclosure, a communication operations is performed a preset number of times with a storage device through an extension line. Each time a correct response is received from the storage device, a status value of the current communication operation would be recorded as a first value, otherwise it would be recorded as a second value. A resultant data string of the values are obtained. A longest data segment comprised of the continuous first values will be searched in the resultant data string, and the delay value of the communication operation corresponding to the status value at the middle position of the longest data segment can be taken as the optimal delay value, which may then be configured as the phase difference between the source clock and the sampling clock of the storage device to compensate for the delays caused by the extension line of the storage device. In this way, it can ensure the transmission speed of the storage device and thus improve the system performance.

The communication operating module 11 can be implemented within or performed by an integrated circuit ("IC"), a signal transceiver, an access terminal, or an access point. The IC may comprise a general-purpose processor, a digital signal processor ("DSP"), and so on. The lookup module 12, processing module 13 and configuration module 14 can be implemented as a central processing unit ("CPU"), conventional processor, controller, computing device, or microprocessor etc.

Those with skill in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general-purpose processor, a digital signal processor ("DSP"), an application specific integrated circuit ("ASIC"), a field programmable gate array ("FPGA") or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The above description depicts merely some exemplary embodiments of the disclosure, but is not meant to limit the scope of the disclosure. Any equivalent structure or flow transformations made to the disclosure, or any direct or indirect applications of the disclosure on other related fields, shall all be covered within the protection of the disclosure.

The invention claimed is:

1. A method of compensating for delays caused by an extension line of a storage device, comprising:
    performing a communication operation a preset number of times with the storage device via the extension line;
    recording a status value of current communication operation as a first value when a correct response is received from the storage device;
    recording the status value of the current communication operation as a second value when a correct response is not received from the storage device; obtaining a resultant data string comprising the recorded status values;
    searching in the resultant data string for a longest data segment comprising continuous first values;
    taking a delay value of the communication operation corresponding to the status value at a middle position of the longest data segment as an optimal delay value; and
    setting the optimal delay value as a phase difference between a source clock and a sampling clock of the storage device, to compensate for the delays caused by the extension line of the storage device.

2. The method according to claim 1, further comprising scanning one by one pre-stored communication operations before performing the communication operations with the storage device.

3. The method according to claim 1, wherein each communication operation comprises a command communication operation or a data communication operation, and the optimal delay value comprises an optimal command delay value or an optimal data delay value, and performing the communication operations with the storage device via the extension line comprises:
    performing the command communication operation the preset number of times with the storage device via a command bus of the extension line to obtain a plurality of status values corresponding respectively to the plurality of command communication operations; or
    performing the data communication operation the preset number of times with the storage device via a data bus of the extension line, to obtain a plurality of status values corresponding respectively to the plurality of data communication operations.

4. The method according to claim 3, wherein performing the command communication operation the preset number of times with the storage device via the command bus of the extension line to obtain the plurality of status values corresponding respectively to the plurality of command communication operations comprises:
    setting an initial delay value of the command communication operation to 0;
    transmitting a pre-stored command to the storage device via the command bus of the extension line;
    recording the status value of current command communication operation as the first value when a response without a cyclic redundancy check (CRC) error is received from the storage device through the command bus of the extension line; otherwise, recording the status value of the current command communication operation as the second value;
    increasing the delay value by 1 and determining whether the computed delay value has reached a preset value;
    returning to perform the operation of transmitting a subsequent pre-stored command to the storage device when the computed delay value has not reached the preset value; and
    ending the process when the computed delay value has reached the preset value.

5. The method according to claim 3, wherein performing the data communication operation the preset number of times with the storage device via the data bus of the extension line to obtain the plurality of status values corresponding respectively to the plurality of data communication operations comprises:
    setting an initial delay value of a data read communication operation to 0;
    transmitting a pre-stored data read command to the storage device via the command bus of the extension line;
    recording the status value of current data read communication operation as the first value when data without a cyclic redundancy check ("CRC") error is correctly received from the storage device via the data bus of the extension line; otherwise, recording the status value of the current data read communication operation as the second value;
    increasing the delay value by 1 and determining whether the computed delay value has reached a preset value;
    returning to perform the operation of transmitting a subsequent pre-stored data read command to the storage device when the computed delay value has not reached the preset value; and
    ending the process when the computed delay value has reached the preset value.

6. The method according to claim 3, wherein performing the data communication operation the preset number of times with the storage device via the data bus of the extension line to obtain the plurality of status values corresponding respectively to the plurality of data communication operations comprises:
    setting an initial delay value of a data write communication operation to 0;
    transmitting a pre-stored data write command to the storage device via the command bus of the extension line, and transmitting data to be written to the storage device via the data bus of the extension line;
    recording the status value of current data write communication operation as the first value when a response informing a data write success is correctly received from the storage device, otherwise, recording the status value of the current data write communication operation as the second value;
    increasing the delay value by 1, and determining whether the computed delay value has reached a preset value;

returning to perform the operation of transmitting a subsequent pre-stored data write command to the storage device when the computed delay value has not reached the preset value; and ending the process when the computed delay value has reached the preset value.

7. The method according to claim 3, wherein each data communication operation comprises a data read communication operation or a data write communication operation, wherein searching in the resultant data string for the longest data segment comprised of the continuous first values comprises: searching for a first longest data segment corresponding to the data read communication operations and a second longest data segment corresponding to the data write communication operations; and wherein taking the delay value of the communication operation corresponding to the status value at the middle position of the longest data segment as the optimal delay value comprises: taking the delay value corresponding to the status value at an middle position of an overlapped portion of the first and second longest data segments as an optimal data delay value.

8. The method according to claim 3, wherein the storage device is a secure digital card.

9. An apparatus for compensating for delays caused by an extension line of a storage device, the apparatus comprising:

a communication operating module, configured to perform a communication operation a preset number of times with the storage device via the extension line, to record a status value of current communication operation as a first value each time a correct response is received from the storage device, and to record the status value of the current communication operation as a second value when a correct response is not received from the storage device to obtain a resultant data string comprising the recorded status values;

a lookup module, coupled to the communication module, and configured to search in the resultant data string for a longest data segment comprised of continuous first values;

a processing module, coupled to the lookup module, and configured to take a delay value of the communication operation corresponding to the status value at a middle position of the longest data segment as an optimal delay value; and a configuration module, coupled to the processing module, and configured to set the optimal delay value as a phase difference between a source clock and a sampling clock of the storage device, to compensate for the delays caused by the extension line of the storage device.

10. The apparatus according to claim 9, wherein each communication operation comprises a command communication operation or a data communication operation, the optimal delay value comprises an optimal command delay value or an optimal data delay value, and the communication operating module comprises:

a command communication module configured to perform the command communication operation the preset number of times with the storage device via a command bus of the extension line to obtain a plurality of status values corresponding respectively to the plurality of command communication operations; and a data communication module configured to perform the data communication operation the preset number of times with the storage device via a data bus of the extension line to obtain a plurality of status values corresponding respectively to the plurality of data communication operations.

11. The apparatus according to claim 10, wherein the command communication module is configured to:

set an initial delay value of the command communication operation to 0;

transmit a pre-stored command to the storage device via the command bus of the extension line;

record the status value of current command communication operation as the first value when a response without a cyclic redundancy check (CRC) error is received from the storage device through the command bus of the extension line, otherwise, record the status value of the current command communication operation as the second value;

increase the delay value by 1, and determine whether the computed delay value has reached a preset value;

return to perform the operation of transmitting a subsequent pre-stored command to the storage device when the computed delay value has not reached the preset value; and end the process when the computed delay value has reached the preset value.

12. The apparatus according to claim 10, wherein the data communication module comprising a data read communication module is configured to:

set an initial delay value of a data read communication operation to 0;

transmit a pre-stored data read command to the storage device via the command bus of the extension line;

record the status value of current data read communication operation as the first value when data without a cyclic redundancy check (CRC) error is correctly received from the storage device via the data bus of the extension line, otherwise, record the status value of the current data read communication operation as the second value; and increase the delay value by 1, and determine whether the computed delay value has reached a preset value;

return to perform the operation of transmitting a subsequent pre-stored data read command to the storage device when the computed delay value has not reached the preset value; and end the process when the computed delay value has reached the preset value.

13. The apparatus according to claim 10, wherein the data communication module comprising a data write communication module is further configured to:

set an initial delay value of a data write communication operation to 0;

transmit a pre-stored data write command to the storage device via the command bus of the extension line, and transmit data to be written to the storage device via the data bus of the extension line;

record the status value of current data write communication operation as the first value when a response informing a data write success is correctly received from the storage device, otherwise, record the status value of the current data write communication operation as the second value;

increase the delay value by 1, and determine whether the delay value has reached a preset value;

return to perform the operation of transmitting a subsequent pre-stored data write command to the storage device when the delay value has not reached the preset value; and end the process when the delay value has reached the preset value.

14. The apparatus according to claim 10, wherein each data communication operation comprises a data read communication operation or a data write communication operation, the lookup module is configured to search for a first longest data segment corresponding to the data read communication operations and a second longest data segment corresponding to the data write communication operations, and the processing module is configured to take a delay value of the communication operation corresponding to the status value at a middle position of an overlapped portion of the first and second longest data segments as the optimal data delay value.

* * * * *